United States Patent [19]

Spors

[11] 4,177,664
[45] Dec. 11, 1979

[54] COMBINED BLANK FORMING AND BENDING TOOL

[76] Inventor: Howard P. Spors, 2162 S. 31th St., Milwaukee, Wis. 53215

[21] Appl. No.: 915,271

[22] Filed: Jun. 13, 1978

[51] Int. Cl.² .................................................. B21D 31/02
[52] U.S. Cl. ........................................ 72/326; 30/229; 30/258; 72/409
[58] Field of Search ................... 72/326, 409; 30/229, 30/218, 363

[56] References Cited

U.S. PATENT DOCUMENTS

| 170,658 | 12/1875 | Berridge | 30/258 |
| 591,999 | 10/1897 | Carter | 30/229 X |
| 812,645 | 2/1906 | Gardner | 30/229 |
| 1,602,169 | 10/1926 | Parnell | 30/229 X |
| 2,224,226 | 12/1940 | Jensen | 30/229 |
| 2,751,681 | 6/1956 | Hillson | 30/229 |
| 3,423,984 | 1/1969 | Keymer | 72/409 X |

*Primary Examiner*—Leon Gilden
*Attorney, Agent, or Firm*—James E. Nilles

[57] ABSTRACT

A tool for sheet metal or the like and for partially cutting blanks from a margin of a workpiece, such as a sheet metal pipe end, and simultaneously and accurately bending the partially cut blank at a substantially right angle to its original position in the plane of the workpiece without distorting the adjacent metal and with one motion of the handles of the tool.

7 Claims, 6 Drawing Figures

COMBINED BLANK FORMING AND BENDING TOOL

BACKGROUND OF THE INVENTION

This invention pertains generally to hand operated shearing tools for forming a series of bent up, spaced apart, partially cut blank portions along the edge of a piece of sheet metal. Joints between various forms of sheet metal are thus provided whereby, for example, a cylindrical member can be joined to a flat sheet by a series of turned tabs or flanges which are spaced around the cylindrical member and are ultimately bent on opposite sides of the flat sheet. Such a joint is shown in the U.S. Pat. No. 3,423,984 to Keymer which issued Jan. 28, 1969 and is entitled "Take-Off Tool". The tool shown in that patent simply cuts a generally rectangular notch from the cylindrical member, leaving intervening tabs which are subsequently turned up by a pliers or the like.

Another example of the prior art is shown in the U.S. Pat. No. 1,602,169 which issued Oct. 5, 1926 to Purnell and entitled "Shearing Tool" in which alternately spaced, partially cut blanks are formed by the tool, but the partially cut blanks must then subsequently be turned or bent by swinging the tool itself through the appropriate arcuate travel, usually 90 degrees; thus two distinct motions are required with the tool to form the turned up tab; namely the first cutting action and then subsequent swinging of the entire tool, all of which results in time consuming effort and not always results in accurately and uniformly cut tabs.

Still another example of the prior art is shown in U.S. Pat. No. 812,645 which issued Feb. 13, 1906 to Gardner and entitled "Combined Punch and Shears" and in which a single slit is cut at an angle to the edge of the metal and one side of the cut is then turned slightly inwardly or laterally to permit insertion of a wire through the cleft and into an aperture.

Other forms of prior art tools of this general character and which have guides or gauges or discharge devices but which simply cut out a complete notch in the metal are shown in the U.S. Pat. Nos. 2,224,226 which issued Dec. 10, 1940 to Jensen and entitled "Industrial Cutting Tool"; U.S. Pat. No. 2,595,841 which issued May 6, 1952 to Glick et al and entitled "Hand Notching Tool"; and U.S. Pat. No. 2,751,681 which issued June 26, 1956 to Hillson and entitled "Miter Guide". cl SUMMARY OF THE INVENTION The present invention provides a hand operated shears for forming a series of partially cut blanks from a margin of a pipe and simultaneously bending the partially cut blanks at a right angle to the pipe. The invention contemplates a hand operating shearing tool which cuts two opposed sides of the blank and simultaneously causes the intervening portion of the metal, namely the partially cut blank, to be bent at a substantially right angle to the sheet or cylinder being cut without damaging or injuring the rest of the material. As a result, a series of accurately aligned and bent partially cut blanks are provided which result in a tight joint between the parts to be joined, such as a cylinder and a flat sheet. A more specific aspect of the invention relates to such a tool having a pair of generally rectangular cutting members, the opposite sides of such members cooperating to form side cuts on the blank and the outermost cooperating edge of the two members having a clearance therebetween to permit the partially cut blank to be turned at a substantially right angle to the sheet or cylinder being cut. A more limited aspect of the invention relates to an adjustable stop means between the two movable handles of the tool whereby the amount or degree of turning of the blank can be varied. In addition, a readily adjustable depth gauge is provided to insure that the blanks are of equal depth to consequently provide a tight joint between the parts to be ultimately assembled.

The present invention also provides a pair of cooperable and interengaging cutting members of the above type which can be used as replacement dies for conventional cutting or notching tools.

These and other objects and advantages of the present invention will appear hereinafter as this disclosure progresses, reference being had to the accompanying drawings.

DESCRIPTION OF A PREFERRED EMBODIMENT

Figure 1:
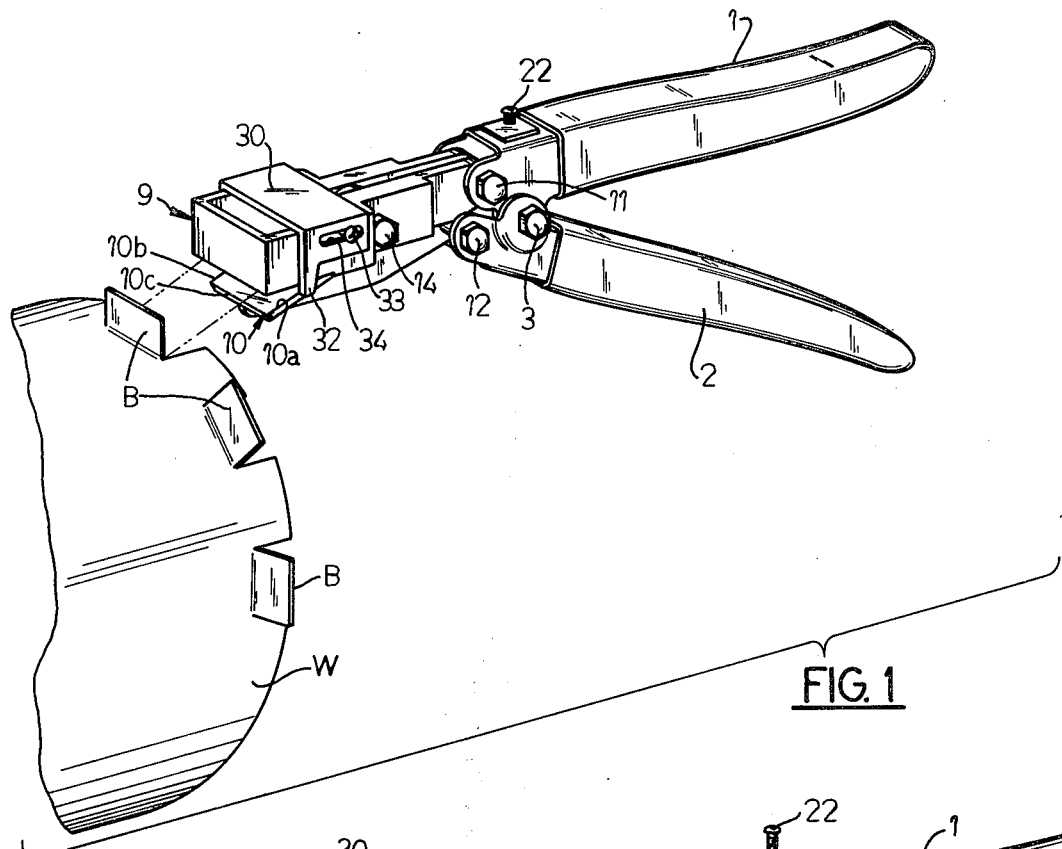
FIG. 1 is a perspective view of a tool made in accordance with the present invention and showing a cylindrical workpiece upon which some tabs have been formed.

The tool of the present invention includes opposite and cooperative handles 1 and 2 which are pivoted together by bolt means 3 which extends through pairs of aligned holes 4 and 5, respectively of the handles 1 and 2. The handles 1 and 2 also have a forward pair of aligned apertures 6 and 7, respectively. A spring member 8 located on bolt means 3 has free ends which abut against the handles 1 and 2 to bias them to the open position, as in the conventional manner.

Figure 3:
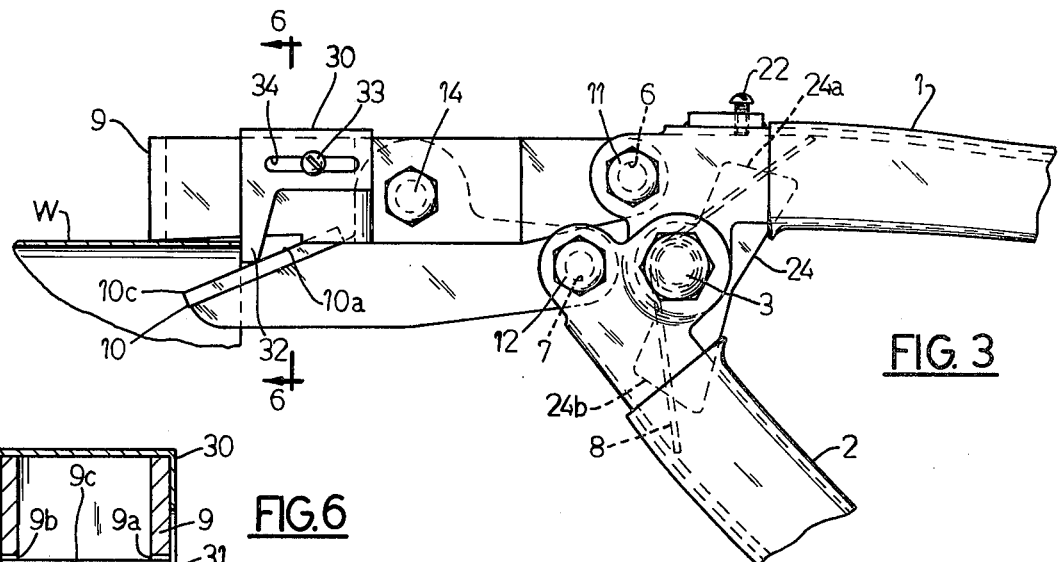
FIG. 3 is a fragmentary side elevational view, on an enlarged scale of the tool shown in FIGS. 1 and 2 and showing the tool when initially inserted on the workpiece and before the cutting operation commences.
Figure 6:
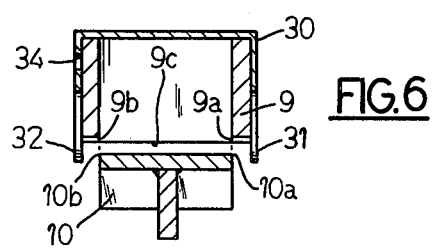
FIG. 6 is a sectional view taken along line 6—6 in FIG. 3.

A pair of cooperating and interengaging cutting members 9 and 10 are pivotally mounted by bolt means 11 and 12, respectively, which extend through aligned apertures 6 and 7, respectively. Thus, the member 9 is a female member and is pivotally mounted on handle 1, while the lower cooperative cutting member is a male member and is mounted on the handle 2. The two cooperating cutting members 9 and 10 are also pivoted to one another by the bolt means 14 which extends through their aligned apertures 15 and 16, respectively. As shown in FIG. 3, when the handles are released, the cooperative cutting members 9 and 10 are spaced apart so as to receive the sheet metal workpiece W therebetween. When the handles are squeezed together as shown in FIGS. 4 and 5, the toggle linkage arrangement formed by the handles and cutting members acts to urge the cutting members 9 and 10 together in a combined cutting and bending action of the workpiece W.

More specifically, the female member 9 is formed by four integral sidewalls arranged in rectangular form and having two cutting edges 9a and 9b, and an intermediate edge 9c. The cutting edges 9a and 9b act in cooperation with the male cutting member 10. More specifically, male member 10 is in the form of a generally rectangular plate that includes cutting edges 10a and 10b which cooperate respectively in the cutting action with the female edges 9a and 9b. Edges 9a and 9b are inclined at an angle to the edges 10a and 10b when viewed in side elevation as shown in FIGS. 3–5 so these cooperating edges positively bite the workpiece without slippage thereof. Furthermore, the edges 10a and 10b and the edges 9a and 9b are convergingly tapered slightly as they extend toward the outer edge edges 10c and 9c of the tool, so as to form a relief in the cut tab to thereby insure easy removal of the tool without binding after the bending is complete.

Figure 4:
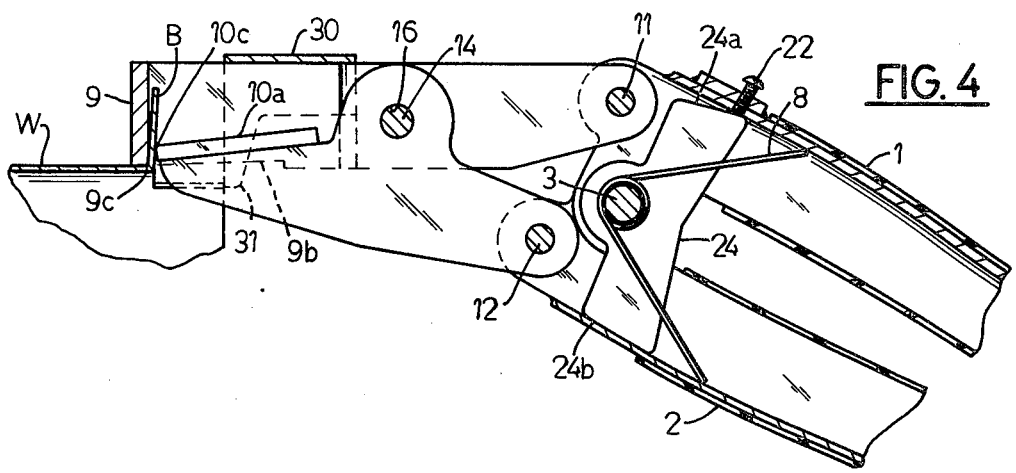
FIG. 4 is a view similar to FIG. 3 and showing the adjustable stop at one of its limits and wherein the partially cut blank has been turned at substantially right angles with a single cutting action of the tool.
Figure 5:
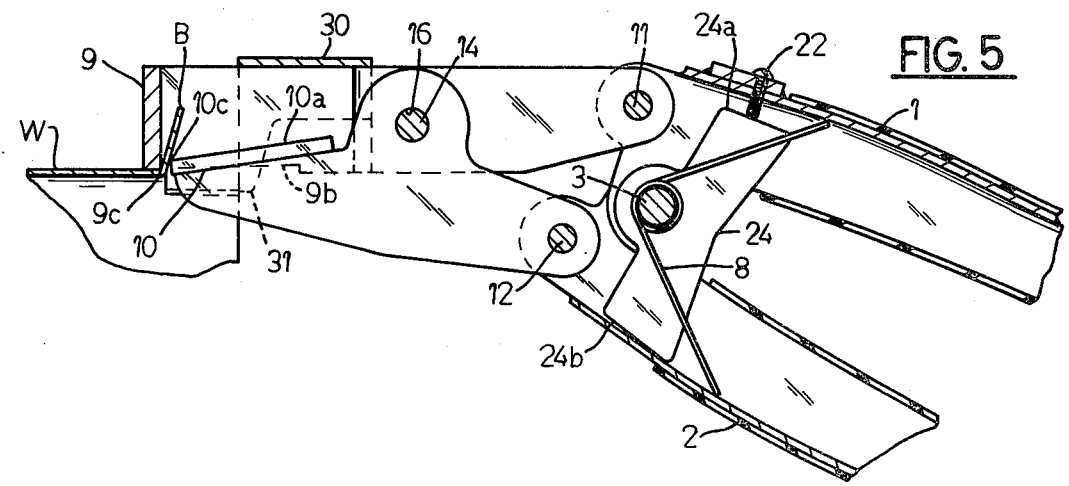
FIG. 5 is a view similar to FIG. 4, but showing the adjustable stop set in the other limit position which results in the partially cut blank being bent up at substantially less than 90 degrees during the single cutting operation.

The male member 10 also has an intervening edge 10c which, when the tool is in the cutting position, as will be noted from FIGS. 4 and 5 particularly, is spaced a distance from the intermediate edge 9c of the female cutting member 9, to thereby provide a clearance between edges 9c and 10c. The amount of spacing between the edges 9c and 10c is such that the partially cut blank B is permitted to be turned or bent from the original position along the plane of the workpiece by the action of the male cutting member 10 as it swings through its cutting action into the upper, generally rectangular female member 9. Stated otherwise, as the cutting member 10, shown in FIG. 3 is urged into cutting or telescoping engagement with the cooperative cutting member 9, the opposite side cutting edges of members 9 and 10 cooperate to cut slits in the workpiece, thus forming the partially cut blank B from the workpiece W. Continued and substantially simultaneous relative movement between the two cutting members 9 and 10 causes the partially cut blank B to be bent from its original position in the workpiece W to the bent position shown in FIGS. 4 and 5.

The dgree to which the blank B is turned can be varied somewhat by adjusting screw 22 threadably located and adjustable in one of the handles, the inner end of the screw bearing against a stop member 24 which is mounted on the bolt 3. The opposite ends 24a and 24b of the stop member 24 are engaged by the inner portions of the handles 1 and 2, respectively, as shown in FIG. 4, thus limiting the travel of the handles towards one another and which results in the partially cut blank B being turned at substantially right angles to the workpiece. When the adjusting screw 22 is threaded further into its handle, the travel of the handles toward one another, is more limited, thereby limiting the distance which the cutting male member 10 travels into the cooperative cutting female member 9 and consequently, limits the degree to which the partially cut blank B is turned or bent out of its original plane with the workpiece W. A convenient means is thereby provided for insuring that the partially cut blanks are all accurately turned the same amount from their original position on the workpiece.

Figure 2:
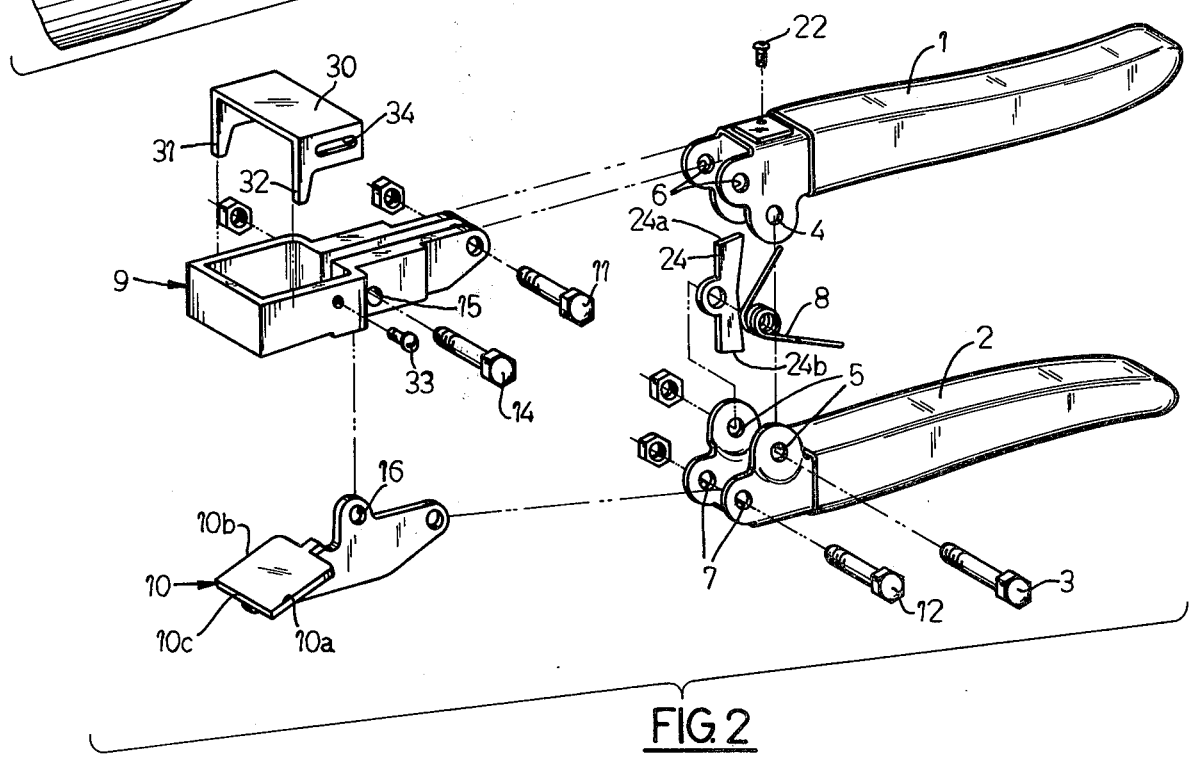
FIG. 2 is a perspective and exploded view of the tool shown in FIG. 1.

A depth gauge 30 is also provided which insures that the workpiece is inserted uniformly into the tool for any one operation, thereby in turn insuring that the partially cut blanks are all of the same length. The gauge 30 has two inwardly extending ears 31 and 32 which extend on the outside of the cooperative cutting edges and against which the workpiece, as shown in FIGS. 3, 4 and 5, abuts when in the cutting-bending position. A screw 33 (FIGS. 1,2 and 3) is threadably engaged in the side of the cutting member 9 and extends through a slot 34 in the guide, thereby permitting ready adjustment of the depth gauge 30.

I claimed:

1. A partial blank cutting and bending tool for sheet metal or the like and comprising, a pair of handles, a cutting female member and a cutting male member comprising a plate, said male member having connection means with said handles for being swung by said handles between workpiece cutting and workpiece releasing positions, said female member having a pair of spaced apart cutting edges and also having a connecting intermediate non-cutting edge between said pair of cutting edges, said male member having cutting edges and swingable between and in cutting cooperation with said cutting edges of said female member, said male member also having an intervening non-cutting edge between its cutting edges, said intervening edge being spaced a distance from said intermediate edge of said female member when said cutting members are urged together; the opposed cutting edges of said members cooperating to cut a pair of slits in the workpiece to define a partially cut blank, said connection means between said handles and said male and female members being positioned to cause said male intervening edge to swing past said female intermediate edge a distance spaced apart to thereby bend said blank between said connecting intermediate non-cutting edge and said intervening non-cutting edge and to a substantial right angle from its original position with said workpiece by movement between said cutting members, whereby a blank is partially cut and simultaneously bent from said workpiece.

2. The tool set forth in claim 1 further characterized in that said female member is formed by integral side walls arranged in generally rectangular form, and said edges of said female member are formed along said walls, said male member being formed as a plate and its edges are located at the periphery of said plate, said plate also being of generally rectangular form complementary to telescoping within said female member.

3. The tool set forth in claim 1 including adjustable stop means for varying the degree to which said blank is bent.

4. A partial blank cutting and bending tool for sheet metal or the like and comprising, a pair of handles pivotally connected together for being swung toward and away from one another for consequent work cutting and releasing positions, respectively; a pair of cooperable and interengaging cutting members having connection means with said handles and also pivotally connected together for being swung by said handles between workpiece cutting and workpiece releasing positions, one of said cutting members being a female member and having a pair of spaced apart cutting edges and also having a connecting non-cutting intermediate edge between said pair of cutting edges, the other of said cutting members being a male member comprising a plate, said male member having cutting edges and swingable between and in cutting cooperation with said cutting edges of said female member, said male member also having an intervening non-cutting edge between its cutting edges, said intervening edge being spaced a distance from said intermediate edge of said female member when said cutting members are urged together;

the opposed cutting edges of said members cooperating to cut a pair of slits in the workpiece to define a partially cut blank, said connecting means between said handles and said male and female members being positioned to cause said male intervening edge to swing past said female intermediate edge a distance spaced apart to thereby bend said blank between said connecting intermediate non-cutting edge and said intervening non-cutting edge and to a substantial right angle from its original position with said workpiece by continued relative movement between said cutting members, whereby a blank is partially cut from said workpiece and generally simultaneously bent therefrom by a single swinging movement of said handles toward one another.

5. The tool set forth in claim 4 further characterized in that said female member is formed by integral side walls arranged in generally rectangular form, and said edges of said female member are formed along said walls, said male member being formed as a plate and its edges are located at the periphery of said plate, said plate also being of generally rectangular form complementary to telescoping within said female member.

6. A pair of cooperable and interengaging cutting members having connection means pivotally connecting them together for being swung between workpiece cutting and workpiece releasing positions, one of said cutting members being a female member and having a pair of spaced apart cutting edges and also having a connecting intermediate non-cutting edge between said pair of cutting edges, the other of said cutting members being a male member comprising a plate, said male member having cutting edges and swingable between sand in cutting cooperation with said cutting edges of said female member, said male member also having an intervening non-cutting edge between its cutting edges, said intervening edge being spaced a distance from said intermediate edge of said female member when said cutting members are urged together; the opposed cutting edges of said members cooperating to cut a pair of slits in the workpiece to define a partially cut blank, said connection means between said members being positioned to cause said male intervening edge to swing past said female intermediate edge a distance spaced apart to thereby bend said blank between said connecting intermediate non-cutting edge and said intervening non-cutting edge and to a substantial right angle from its original position with said workpiece by continued relative movement between said cutting members, whereby a blank is partially cut from said workpiece and generally simultaneously bent therefrom by a single swinging movement of said members.

7. The tool set forth in claim 6 further characterized in that said female member is formed by integral side walls arranged in generally rectangular form, and said edges of said female member are formed along said walls, said male member being formed as a plate and its edges are located at the periphery of said plate, said plate also being of generally rectangular form complementary to telescoping within said female member.

* * * * *